United States Patent
Maekawa

(10) Patent No.: US 10,822,476 B2
(45) Date of Patent: Nov. 3, 2020

(54) RUBBER COMPOSITION

(71) Applicant: BRIDGESTONE CORPORATION, Tokyo (JP)

(72) Inventor: Kazuhiro Maekawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 48 days.

(21) Appl. No.: 16/096,068

(22) PCT Filed: Apr. 21, 2017

(86) PCT No.: PCT/JP2017/016014
§ 371 (c)(1),
(2) Date: Oct. 24, 2018

(87) PCT Pub. No.: WO2017/188139
PCT Pub. Date: Nov. 2, 2017

(65) Prior Publication Data
US 2019/0127559 A1 May 2, 2019

(30) Foreign Application Priority Data
Apr. 25, 2016 (JP) .................. 2016-086918

(51) Int. Cl.
| | |
|---|---|
| *C08L 9/06* | (2006.01) |
| *C08L 57/02* | (2006.01) |
| *C08L 45/00* | (2006.01) |
| *B60C 1/00* | (2006.01) |
| *C08K 3/04* | (2006.01) |
| *C08K 3/36* | (2006.01) |

(52) U.S. Cl.
CPC .................. *C08L 9/06* (2013.01); *B60C 1/00* (2013.01); *B60C 1/0016* (2013.01); *C08K 3/04* (2013.01); *C08K 3/36* (2013.01); *C08L 45/00* (2013.01); *C08L 57/02* (2013.01); *C08L 2205/025* (2013.01); *C08L 2205/03* (2013.01); *Y02T 10/862* (2013.01)

(58) Field of Classification Search
CPC .. C08L 9/06; C08L 57/02; C08L 45/00; C08L 2205/025; C08L 2205/03; C08K 3/04; C08K 3/36; B60C 1/00; B60C 1/0016; Y02T 10/862

USPC ........................................................ 523/156
See application file for complete search history.

(56) References Cited

U.S. PATENT DOCUMENTS

| 9,150,712 B2 | 10/2015 | Takizawa et al. |
| 2003/0199669 A1* | 10/2003 | Saito ................. C08K 3/36 528/393 |
| 2004/0261927 A1 | 12/2004 | Weydert et al. |
| 2013/0059965 A1 | 3/2013 | Hirose |
| 2013/0237653 A1 | 9/2013 | Takizawa et al. |

FOREIGN PATENT DOCUMENTS

| EP | 2 433 812 A1 | 3/2012 |
| EP | 3 000 618 A1 | 3/2016 |
| JP | 2002-097308 A | 4/2002 |
| JP | 2003-183446 A | 7/2003 |
| JP | 2005-023295 A | 1/2005 |
| JP | 2005002295 A * | 1/2005 |
| JP | 2010-126672 A | 6/2010 |
| JP | 2011-246561 A | 12/2011 |
| JP | 2013213183 A | 10/2013 |
| WO | 2015/166931 A1 | 11/2015 |

OTHER PUBLICATIONS

Derwent Abstract for JP 2005-002295 (Year: 2005).*
Progress in Rubber Nanocomposites, Edited by Thomas et al., Woodhead Publishing, p. 6. (Year: 2017).*
International Preliminary Report on Patentability with translation of Written Opinion dated Nov. 8, 2018, issued by the International Searching Authority in application No. PCT/JP2017/016014.
Extended European Search Report dated Apr. 1, 2019 issued by the European Patent Office in counterpart application No. 17789422.7.
International Search Report for PCT/JP2017/016014 dated Jul. 25, 2017 [PCT/ISA/210].

* cited by examiner

*Primary Examiner* — Angela C Scott
(74) *Attorney, Agent, or Firm* — Sughrue Mion, PLLC

(57) ABSTRACT

Provided is a rubber composition for a tread which is improved in a wet grip property and a dry grip property and which allows an improvement in a low temperature brittleness to be compatible with a wet grip property and a dry grip property, characterized in that a polymer having a low glass transition temperature is further used in combination with a solution polymerized styrene butadiene rubber and an emulsion polymerized styrene butadiene rubber each having a specific glass transition temperature and a specific molecular weight distribution.

13 Claims, No Drawings

RUBBER COMPOSITION

CROSS REFERENCE TO RELATED APPLICATIONS

This application is a National Stage of International Application No. PCT/JP2017/016014 filed Apr. 21, 2017, claiming priority based on Japanese Patent Application No. 2016-086918 filed Apr. 25, 2016.

TECHNICAL FIELD

The present invention relates to a rubber composition suitable for a tread which is improved in a wet grip property and a dry grip property and which allows an improvement in a low temperature brittleness to be compatible with the wet and dry grip properties while reducing a rolling resistance.

BACKGROUND ART

A safety and a running stability on road surfaces of various conditions such as dry road surfaces, wet road surfaces, and snow and ice road surfaces are required for performances of tires. A wet grip property and a dry grip property which are sustainable have to be enhanced particularly in a tread part which is brought into contact with a road surface. Also, the whole part of a tire including a tread part is exposed to low temperature in a cold season regardless of whether or not the car travels on a snow and ice road surface, and therefore the tire is required to be improved as well in a low temperature brittleness.

A styrene butadiene rubber: SBR is used in many cases in order to enhance a wet grip property. In particular, a solution polymerized styrene butadiene rubber: S-SBR is useful in terms of a molecular weight, a main chain structure, terminal groups, and easiness in controlling various physical properties originating in a chemical structure formed by the matters described above. For example, S-SBR having a specific glass transition temperature: Tg is used. Above all, a case of blending two kinds of solution polymerized styrene butadiene rubbers is known as is the case with patent document 1.

On the other hand, it is not generally preferable in terms of a low temperature brittleness to use only SBR. Also, it results in increasing a cost, to be natural, to use SBR, particularly S-SBR in a large amount.

CONVENTIONAL ART DOCUMENT

Patent Document

Patent document 1: Japanese Patent Application Laid-Open No. 2013-213183

DISCLOSURE OF THE INVENTION

Desired is a rubber composition suitable for a tread which improves a wet grip property and a dry grip property and which allows an improvement in a low temperature brittleness to be compatible with the wet and dry grip properties in good balance while reducing a rolling resistance.

Means for Solving the Problems

Provided is a rubber composition suitable for a tread characterized in that a polymer having a low Tg is further used in combination with a solution polymerized SBR and an emulsion polymerized SBR each having a specific Tg and a specific molecular weight distribution.

That is, the present invention resides in the following items (1) to (8).

(1) A rubber composition of a diene rubber comprising an emulsion polymerized styrene butadiene rubber: E-SBR and a solution polymerized styrene butadiene rubber: S-SBR each having a glass transition temperature: Tg of −25° C. or higher measured by a differential scanning calorimetry, and a polymer: P having a lower Tg than Tg of the emulsion polymerized styrene butadiene rubber and the solution polymerized styrene butadiene rubber, wherein a ratio: (E-SBR+S-SBR)/P of the sum of the E-SBR and the S-SBR in terms of a part by weight to the polymer: P having a lower Tg in terms of a part by weight satisfies 7/3 to 9/1, and a molecular weight distribution: Mw/Mn of either polymer having a higher Tg out of the E-SBR and the S-SBR satisfies 2.5 or less.

(2) The rubber composition as described in the above item (1), wherein at least one thermoplastic resin selected from the group consisting of a $C_5$ resin, a $C_5C_9$ resin, a $C_9$ resin, a rosin-modified petroleum resin, a dicyclopentadiene resin, a terpene resin, and an alkylphenol resin each having a softening point of 100° C. or higher is blended in an amount of 1 to 30 parts by weight based on 100 parts by weight of the diene rubber described above.

(3) The rubber composition as described in the above item (1) or (2), wherein either polymer having a higher Tg out of the emulsion polymerized styrene butadiene rubber and the solution polymerized styrene butadiene rubber is modified.

(4) The rubber composition as described in any one of the above items (1) to (3), wherein 0.5 to 6 parts by weight of an elastic modulus modifier and silica are blended.

(5) The rubber composition as described in any one of the above items (1) to (4), wherein the polymer: P having a lower Tg than Tg of the emulsion polymerized styrene butadiene rubber and the solution polymerized styrene butadiene rubber is selected from a natural rubber: NR and/or a butadiene rubber: BR.

(6) The rubber composition as described in any one of the above items (1) to (5), wherein the butadiene rubber: BR is contained in an amount of 0 to 10 parts by weight.

(7) The rubber composition as described in the above item (4), wherein the elastic modulus modifier is maleic acid•polyethylene glycol polycondensate.

(8) A pneumatic tire prepared by using the rubber composition as described in any one of items (1) to (7) for tread part.

Effect of the Invention

A rubber composition suitable for a tread which is reduced in a rolling resistance while being improved in a wet grip property and a dry grip property and which allows an improvement in a low temperature brittleness to be compatible with the wet and dry grip properties is obtained according to the above item (1).

A rubber composition suitable for a tread which is further improved in a wet grip property and a dry grip property is obtained according to the above item (2).

A rubber composition suitable for a tread which is further reduced in a rolling resistance and improved in a fuel consumption performance is obtained according to the above item (3).

A storage elastic modulus: E' is increased to contribute to improving for a dry handling according to the above items (4) and (7).

A rubber composition in which the kind of the polymer suited to an improvement in a low temperature brittleness is obtained according to the above item (5).

A blend amount of the butadiene rubber: BR used is shown according to the above item (6).

A pneumatic tire having a tread part which is lowered in a rolling resistance while being improved in a wet grip property and a dry grip property and which allows an improvement in a low temperature brittleness to be compatible with the wet and dry grip properties and is excellent in a fuel consumption performance is obtained according to the above item (8).

MODE FOR CARRYING OUT THE INVENTION

The rubber composition of the present invention is a diene rubber composition comprising an emulsion polymerized styrene butadiene rubber: E-SBR and a solution polymerized styrene butadiene rubber: S-SBR each having a glass transition temperature: Tg of −25° C. or higher measured by a differential scanning calorimetry, and a polymer: P having a lower Tg than Tg of the emulsion polymerized styrene butadiene rubber and the solution polymerized styrene butadiene rubber, wherein a ratio: (E-SBR+S-SBR)/P of the sum of the emulsion polymerized styrene butadiene rubber and the solution polymerized styrene butadiene rubber in terms of a part by weight to the polymer: P in terms of a part by weight satisfies 7/3 to 9/1, and a molecular weight distribution: Mw/Mn of either polymer having a higher Tg out of the emulsion polymerized styrene butadiene rubber and the solution polymerized styrene butadiene rubber satisfies 2.5 or less.

The styrene butadiene rubber used in the present invention is one of diene synthetic rubbers most generally used, and the styrene butadiene rubber is characterized in using in combination an emulsion polymerized styrene butadiene rubber and a solution polymerized styrene butadiene rubber which are produced by different polymerization methods.

The emulsion polymerized styrene butadiene rubber: E-SBR prepared by emulsion-dispersing two kinds of the monomers of styrene and 1,3-butadiene in water and polymerizing the resulting emulsion by a radical initiator. A surfactant is usually used for emulsifying the monomers. The type is classified into a cold type in which polymerization is carried out at 5 to 10° C. and a hot type in which polymerization is carried out at 40 to 50° C. according to the polymerization temperature. The styrene butadiene rubber is a synthetic rubber which is better in an aging resistance, a heat resistance and a wear resistance than NR and which is excellent in an overall balance of processability, a physical property and a cost.

In E-SBR, parts originating in the respective monomers may be aligned in a block form or at random. A content of 20.0 to 55.0%, preferably 35.0 to 55.0% can be used in terms of a monomer fraction of styrene.

The solution polymerized styrene butadiene rubber: S-SBR is obtained by living anionic polymerization of the monomers in an organic solvent with an anionic polymerization initiator. The control of polymerization modes such as block copolymerization and random copolymerization, and the end group modification with an initiator and a terminator are readily made. In the present invention, the rubber concerned can be used regardless of modifying the end groups, but the rubber in which the end groups have been modified can suitably be used. The solution polymerized styrene butadiene rubber is excellent in a dynamic property, a low temperature property and a strong bending crack resistance.

In the S-SBR, parts originating in the respective monomers may be aligned in a block form or at random. A content of 20.0 to 55.0%, preferably 35.0 to 55.0% can be used in terms of a monomer fraction of styrene.

Further, the polymer: P having a lower Tg than Tg of both styrene butadiene rubbers described above is blended with the styrene butadiene rubber of the main component in the present application in order to improve a low temperature brittleness, and a blend ratio thereof can be used in a range of 7/3 to 9/1 based on the total of the E-SBR and the S-SBR in terms of (E-SBR+S-SBR)/P. In a case where a blend ratio of the polymer: P having a lower Tg is 10% by weight or more, the low temperature brittleness is improved. When the blend ratio is 30% by weight or less, the wet performance and the dry performance are maintained in suitable ranges.

With respect to the specific blend amounts, 10 to 60 parts by weight of the E-SBR, 10 to 60 parts by weight of the S-SBR and 10 to 30 parts by weight of the polymer P can be used assuming that the total rubber component including both SBR and the low Tg polymer: P is 100 parts by weight, and it is preferable to use the E-SBR in a range of 20 to 50 parts by weight and the S-SBR in a range of 20 to 60 parts by weight, particularly preferable to use the E-SBR in a range of 20 to 40 parts by weight and the S-SBR in a range of 30 to 60 parts by weight.

Both the E-SBR and the S-SBR used in the present invention are characterized by having a glass transition temperature: Tg of −25° C. or higher measured by a differential scanning calorimetry. If both SBR have Tg of −25° C. or higher, the wet performance and the dry performance are maintained well. In the case of the S-SBR, Tg is more preferably −20° C. or higher.

In the present invention, either polymer having a higher Tg out of the E-SBR and the S-SBR shall be referred to as high Tg SBR, and similarly the polymer having a lower Tg shall be referred to as low Tg SBR. The high Tg SBR may be the E-SBR or the S-SBR. However, even the low Tg SBR has a higher Tg than Tg of the low Tg polymer: P described above.

The high Tg SBR is characterized by having a molecular weight distribution: Mw/Mn of 2.5 or less. The molecular weight distribution is a value measured by a usual size excluding chromatography with polystyrene standard calibration, and the molecular weight distribution may be measured by using field flow fractionation: FFF, a combination thereof with multi-angle light scattering: MALS, and an ultra-centrifugal method.

The above described Mw/Mn of the high Tg SBR is preferably 2.2 or less, particularly preferably 1.8 or less. Controlling Mw/Mn to the range described above makes it possible to design the rubber composition so that a tan δ curve thereof is optimal and allow the wet performance to be excellently compatible with the low rolling resistance.

Also, the rubber composition modified so that an affinity thereof with silica is increased may be used as one of the preferred embodiments as described later. In the above case, the high Tg SBR is an object subjected to silica affinity modification. That is, bonding of the polymer having higher Tg with the silica which is a filler for increasing the gripping property is enhanced.

A thermoplastic resin may be used for the rubber composition of the present invention as one of the preferred embodiments for the purpose of improving the wet grip property. The resin which can be used includes thermoplastic resins which have a molecular weight of several hundreds to several thousands and which give a tackiness by blending with a natural rubber and a synthetic rubber, and various natural resins and synthetic resins can be used.

To be specific, resins including natural resins such as rosin resins and terpene resins, petroleum resins, phenol resins, coal resins, and xylene resins each having a weight average molecular weight of preferably 500 to 5000, more preferably 700 to 4000 can be used.

The rosin resins include resins of glycerin or pentaerythritol ester of rosins such as gum rosins, wood rosins, hydrogenated rosins, disproportionated rosins, polymerized rosins, and modified rosins, and the terpene resins include terpene resins such as α-pinene resins, β-pinene resins, and dipenetene resins, resins such as aromatic-modified terpene resins, terpene phenol resins, and hydrogenated terpene resins.

Among the natural resins described above, the polymerized rosins, the terpene phenol resins and the hydrogenated terpene resins are preferred in terms of a wear resistance and a gripping property of the rubber composition blended with the natural resins.

The petroleum resins are obtained by polymerization of, for example, cracked oil fractions containing unsaturated hydrocarbons such as olefins and diolefins by-produced together with petrochemical materials such as ethylene and propylene in the form of a mixture by pyrolysis of naphtha with a Friedel-Crafts catalyst in a petrochemical industry.

The petroleum resins include petroleum resins such as aliphatic petroleum resins obtained by polymerization or copolymerization of a $C_5$ fraction obtained by pyrolysis of naphtha, aromatic petroleum resins obtained by polymerization or copolymerization of a $C_9$ fraction obtained by pyrolysis of naphtha, copolymerized petroleum resins obtained by copolymerization of the $C_5$ fraction and the $C_9$ fraction each described above, hydrogenated resins, alicyclic compound petroleum resins such as dicyclopentadiene resins, styrene resins which are copolymers of styrene, substituted styrene and other monomers.

The $C_5$ fraction obtained by pyrolysis of naphtha includes usually olefin hydrocarbons such as 1-pentene, 2-pentene, 2-methyl-1-butene, 2-methyl-2-butene, and 3-methyl-1-butene, diolefin hydrocarbons such as 2-methyl-1,3-butadiene, 1,2-pentadiene, 1,3-pentadiene, and 3-methyl-1,2-butadiene.

Also, the aromatic base petroleum resins obtained by polymerization or copolymerization of the $C_9$ fraction are resins obtained by polymerization of aromatic compounds having 9 carbon atoms comprising vinyltoluene and indene as main monomers, and the specific examples of the $C_9$ fraction obtained by pyrolysis of naphtha include styrene homologues such as α-methylstyrene, β-methylstyrene, and γ-methylstyrene, indene homologues such as indene and coumarone.

The brand names thereof include Petrosin manufactured by Mitsui Petrochemical, Inc., Petlite manufactured by Mikuni Chemical Industry Co., Ltd., Neo Polymer manufactured by JXTG Nippon Oil & Energy Corporation, Petcol, Petrotac manufactured by Tosoh Corporation.

Further, modified petroleum resins obtained by modification of the foregoing petroleum resins comprising the $C_9$ fraction can be used in the present invention as resins which make it possible to allow the gripping property to be compatible with the factory workability.

The modified petroleum resins include $C_9$ petroleum resins modified by unsaturated alicyclic compounds, $C_9$ petroleum resins modified by compounds having hydroxyl groups, and $C_9$ petroleum resins modified by unsaturated carboxylic acid compounds.

The preferred unsaturated alicyclic compounds include cyclopentadiene, methylcyclopentadiene and the like, and Diels-Alder reaction products of alkylcyclopentadiene such as dicyclopentadiene, cyclopentadiene/methylcyclopentadiene codimers, and tricyclopentadiene, and dicyclopentadiene is particularly preferred.

The dicyclopentadiene-modified $C_9$ petroleum resins can be obtained by thermal polymerization under the presence of both of cyclopentadiene and the $C_9$ fraction.

The dicyclopentadiene-modified $C_9$ petroleum resins include, for example, Neo Polymer 130S manufactured by JXTG Nippon Oil & Energy Corporation.

In the present invention, the copolymer resins of the $C_5$ fraction and the $C_9$ fraction obtained by pyrolysis of naphtha, or the aromatic petroleum resins obtained by polymerization of the $C_9$ fraction, for example, Neo Polymer manufactured by JXTG Nippon Oil & Energy Corporation can suitably be used.

To be specific, the resins include products such as TS30, TS30-DL, TS35, TS35-DL of a Structol series manufactured by SCHILL & SEILACHER GmbH, Petrotac manufactured by Tosoh Corporation.

The phenol resins described above include resins such as alkylphenol formaldehyde resins and rosin-modified products thereof, alkylphenol acetylene resins, modified alkylphenol resins, and terpene phenol resins, and to be specific, the phenol resins include a brand name Hitanol 1502 which is a novolac type alkylphenol resin, manufactured by Hitachi Chemical Industry Co., Ltd., and a brand name Koresin which is a p-t-butylphenol acetylene resin, manufactured by BASF A.G.

The thermoplastic resins having a softening point of 100° C. or higher measured based on ASTM E28-58-T can be used, and the softening point thereof falls in a range of preferably 100 to 150° C.

The resins described above may be used alone or in a mixture of two or more kinds thereof, and the resins are blended in an amount of 1 to 30 parts by weight, preferably 3 to 10 parts by weight based on 100 parts by weight of the rubber component.

A modified high Tg SBR may be used for the rubber composition of the present invention as one of the preferred embodiments.

A part or a whole part modified high Tg SBR is preferable. For example, when the high Tg SBR is the S-SBR, 1,3-butadiene and styrene are copolymerized by living anionic polymerization in a solution using an initiator such as organolithium and lithium amide, and a modifier is reacted with an active end of the resulting copolymer to obtain an end-modified SBR.

At least one compound selected from a hydrocarbyloxysilane compound and partially condensed products thereof represented by the following general Formula (I) can be listed as the modifier:

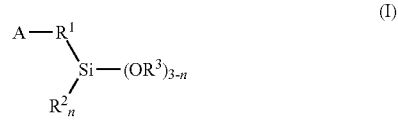

wherein when A=A¹, A¹ is a monovalent group having at least one functional group selected from epoxy, thioepoxy, isocyanate, thioisocyanate, ketone, thioketone, aldehyde, thioaldehyde, imine, amide, trihydrocarbyl isocyanurate, carboxylate esters, thiocarboxylate esters, metal salts of carboxylate, metal salts of thiocarboxylate, carboxylic anhydride, carboxylic halide, and dihydrocarbyl carbonate; $R^1$ is a single bond or a divalent inert hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2; when plural $R^2$ are present, the plural $R^2$ may be the same or different, and when plural $OR^3$ are present, the plural $OR^3$ may be the same or different; and active protons and onium salts are not contained in the molecule.

In general Formula (I), imine among the functional groups in $A^1$ includes ketimine, aldimine and amidine, and the carboxylate esters include unsaturated carboxylate esters such as acrylate, and methacrylate. Also, metals such as alkali metals, alkaline earth metals, Al, Sn and Zn can be listed as the metals of the metal salts of carboxylate or thiocarboxylate.

An alkanediyl group having 1 to 20 carbon atoms can be preferably listed as the divalent inert hydrocarbon group of $R^1$. The above alkanediyl group may be any of linear, branched and cyclic groups, and the linear group is particularly suitable. The examples of the linear alkanediyl group include a methanediyl, an ethanediyl, a propanediyl, a butanediyl, a pentanediyl, a hexanediyl, an octanediyl, a decanediyl and a dodecanediyl group.

An alkyl group having 1 to 20 carbon atoms, an alkenyl group having 2 to 18 carbon atoms, an aryl group having 6 to 18 carbon atoms, and an arylalkyl group having 7 to 18 carbon atoms can be listed as $R^2$ and $R^3$. The alkyl group and the alkenyl group may be any of linear, branched and cyclic groups, and the alkyl group and the alkenyl group include, for example, methyl, ethyl, 1-propyl, 2-propyl, 1-butyl, 2-butyl, 2-methyl-1-propyl, 2-methyl-2-propyl, pentyl, hexyl, octyl, decyl, dodecyl, cyclopentyl, cyclohexyl, vinyl, propenyl, allyl, hexenyl, octenyl, cyclopentenyl, and cyclohexenyl. Also, the aryl group may have a substituent such as a simple alkyl group on the aromatic ring, and the examples thereof include groups such as phenyl, tolyl, xylyl and naphthyl. Further, the arylalkyl group may have a substituent having an aromatic ring on the simple alkyl group, and the arylalkyl includes, for example, benzyl, phenethyl and naphthylmethyl.

The term n is preferably an integer of 0 to 2, preferably 0, and active protons and onium salts are not present in the molecule.

Capable of being preferably listed as the hydrocarbyloxysilane compound represented by general Formula (I) are, for example, epoxy group- or thioepoxy group-containing hydrocarbyloxysilane compound such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, and compounds obtained by substituting the epoxy groups in the above compounds with thioepoxy groups. Among the compounds, 3-glycidoxypropyltrimethoxysilane and 2-(3,4-epoxycyclohexyl)ethyltrimethoxysilane are particularly suitable.

Capable of being preferably listed as the imine group-containing hydrocarbyloxysilane compound are N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N, N-dimethylaminobenzylidene)-3-(triethoxysilyl)-1-propaneamine, N-(cyclohexylidene)-3-(triethoxysilyl)-1-propaneamine, and trimethoxysilyl compounds, ethyldiethoxysilyl compounds, methyldimethoxysilyl compounds and ethyldimethoxysilyl compounds each corresponding to the above triethoxysilyl compounds. Among the compounds, N-(1-methylpropylidene)-3-(triethoxysilyl)-1-propaneamine and N-(1,3-dimethylbutylidene)-3-(triethoxysilyl)-1-propaneamine are particularly suitable.

Further, the following compounds can be listed as the other hydrocarbyloxysilane compound. That is, capable of being listed as the imine or amidine group-containing compounds are 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, and the like, and among the compounds, capable of being preferably listed are 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(triethoxysilyl)propyl]-4,5-dihydroimidazole and 1-[3-(trimethoxysilyl)propyl]-4,5-dihydroimidazole. Also, the compounds include N-(3-(triethoxysilylpropyl)-4,5-dihydroimidazole, N-(3-(isopropoxysilylpropyl)-4,5-dihydroimidazole and N-(3-(methyldiethoxysilylpropyl)-4,5-dihydroimidazole, and among the compounds, N-(3-(triethoxysilylpropyl)-4,5-dihydroimidazole is preferred.

The carboxylate ester group-containing compounds include compounds such as 3-methacryloyloxypropyltriethoxysilane, 3-methacryloyloxypropyltrimethoxysilane, 3-methacryloyloxypropylmethyldiethoxysilane, and 3-methacryloyloxypropyltriisopropoxysilane, and among the compounds, 3-methacryloyloxypropyltrimethoxysilane is preferred.

Further, the isocyanate group-containing compounds include compounds such as 3-isocyanatepropyltrimethoxysilane, 3-isocyanatepropyltriethoxysilane, 3-isocyanatepropylmethyldiethoxysilane and 3-isocyanatepropyltriisopropoxysilane, and among the compounds, 3-isocyanatepropyltriethoxysilane is preferred.

Also, the carboxylic anhydride-containing compounds include compounds such as 3-triethoxysilylpropylsuccinic anhydride, 3-trimethoxysilylpropylplsuccinic anhydride and 3-methyldiethoxysilylpropylsuccinic anhydride, and among the compounds, 3-triethoxysilylpropylsuccinic anhydride is preferred.

At least one hydrocarbyloxysilane compound in which A is $A^2$ in general Formula (I) and in which $A^2$ is a cyclic secondary amino group, an acyclic secondary amino group, a silyl-substituted amino group, a pyridyl group, a sulfide group and polysulfide group, and/or partially condensed compound can be used in combination with the modifier described above. The modifier of a combined-use type is not subjected substantially to direct reaction with the polymerization active end and remains unreacted in the reaction system, and therefore the modifier of a combined-use type is consumed for condensation with a hydrocarbyloxysilane compound residue introduced into the active end.

With respect to the hydrocarbyloxysilane compound in which A is $A^2$ in general Formula (I), for example, the acyclic secondary amino group-containing hydrocarbyloxysilane compound includes compounds such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, N,N-bis(trimethylsilyl)-3-aminopropyltriethoxysilane, N,N-bis(trimethylsilyl)-3-aminopropylmethyldiethoxysilane, and among the compounds, 3-diethylaminopropyl(triethoxy)silane and 3-dimethylaminopropyl(triethoxy)silane are preferred.

Also, capable of being listed as the cyclic secondary amino group-containing hydrocarbyloxysilane compound are 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrodinyl)propyl(triethoxy)silane, 3-(1-pyrrodinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, and 3-(1-hexamethyleneimino)propyl(diethoxy)ethylsilane, and among the compounds, 3-(1-hexamethyleneimino)propyl(triethoxy)silane is suitable.

Further, compounds such as 2-(trimethoxysilylethyl)pyridine, 2-(triethoxysilylethyl)pyridine and 4-ethylpyridine can be listed as the other hydrocarbyloxysilane compound.

Also, capable of being used are the compound in which A is $A^3$ in general Formula (I) and in which $A^3$ is represented by a monovalent group having at least one functional group selected from alcohols, thiols, primary amines and onium salts thereof, cyclic secondary amines and onium salts thereof, acyclic secondary amines and onium salts thereof, onium salts of cyclic tertiary amines, onium salts of acyclic tertiary amines, groups having an aryl- or arylalkyl-Sn bond, sulfonyl, sulfinyl, and nitrile, and/or a partially condensed compound.

The primary amine which is $A^3$ includes aromatic amines such as aniline, and the acyclic secondary amine includes N-monosubstituted aromatic amines such as N-monosubstituted aniline. Further, the onium salts of the acyclic tertiary amines include onium salts of N,N-disubstituted aromatic amines such as N,N-disubstituted aniline. Also, in the cases of the cyclic secondary amines and the cyclic tertiary amines, ether and/or thioether can be included therein as a part of the rings.

Capable of being listed as the hydrocarbyloxysilane compound in which A is $A^3$ are, for example, compounds such as 3-aminopropyltrimethoxysilane, 3-aminopropyltriethoxysilane, hydroxymethyltrimethoxysilane, hydroxymethyltriethoxysilane, mercaptomethyltrimethoxysilane, mercaptomethyltriethoxysilane, aminophenyltrimethoxysilane, aminophenyltriethoxysilane, 3-(N-methylamino)propyltrimethoxysilane, 3-(N-methylamino)propyltriethoxysilane, octadecyldimethyl(3-trimethylsilylpropyl)ammonium chloride, octadecyldimethyl(3-triethylsilylpropyl)ammonium chloride, cyanomethyltrimethoxysilane, cyanomethyltriethoxysilane, sulfonylmethyltrimethoxysilane, sulfonylmethyltriethoxysilane, sulfinylmethyltrimethoxysilane, and sulfinylmethyltriethoxysilane.

In addition thereto, though not corresponding to general Formula (I), a modifier such as tetraethoxysilane and tin tetrachloride can be used as well. Further, the anionic polymerization is carried out using as an initiator, lithium hexamethyleneimide prepared in situ with hexamethyleneimine-n-BuLi, and tin tetrachloride is used in terminating the ends, whereby a hexamethyleneimino group and a trichlorostannyl group can be introduced respectively into both ends of the polymer. The polymer may be modified so to introduce an amino group or an imino group into one end and introduce a silyl group or a tin-containing group into the other end in the similar manner.

Modification of the ends of the high Tg SBR in the manner described above is advantageous for improving dispersibility of silica. On the other hand, the present invention is characterized by blending a relatively large amount of silica even in modification of the ends of the high Tg SBR. Carbon black and silica which are reinforcing fillers are blended in an amount of 50 to 250 parts by mass, preferably 50 to 150 parts by mass based on 100 parts by mass of the rubber component, and in particular, blending 60% by mass or more, preferably 80% by mass or more of silica contributes mainly to enhancing the wet performance.

An elastic modulus modifier may be blended with the rubber composition of the present invention as one of the preferred embodiments. The elastic modulus modifier includes maleic acid•polyethylene glycol polycondensate.

Blending maleic acid•polyethylene glycol polycondensate together with silica provides the effects of increasing generally the storage elastic modulus: E' and improving the dry handling property regardless of a temperature range.

It is convenient to blend maleic acid•polyethylene glycol polycondensate blended in advance with silica as the elastic modulus modifier. A product generally available as a commercial product is limited, and therefore a blend ratio of silica is adjusted otherwise.

The low Tg polymer: P having lower Tg than Tg of both SBR which are the main components of the rubber composition is blended in order to improve the low temperature brittleness, and in the embodiment of the present invention, at least one selected from a natural rubber: NR and a butadiene rubber: BR is suitably used. Both of natural rubber and butadiene rubber are referred to mainly as 1,4-polymers of monomers having a diene skeleton, and natural rubber and butadiene rubber are polymers having independently an excellent resistance to the low temperature brittleness. When the polymer is blended as the component of the rubber composition of the present invention, the polymer contributes to an improvement in the low temperature brittleness supplementing both SBR which are the main components. NR is, as a matter of course, a polymer comprising 100% of a structure in which isoprene units are subjected to 1,4-cis bonding, and therefore the 1,4-cis bonding amount is preferably 90% or more as well in the case of BR.

When the butadiene rubber is used as the low Tg polymer, the butadiene rubber is used in a range of 0 to 10 parts by weight assuming that the total amount of the rubber components is 100 parts by weight, but the butadiene rubber may not be blended, that is, 0 part by weight. The natural rubber is prioritized in terms of the cost and a balance with the other properties.

In addition to the rubber components described above, various components usually used in the rubber industry can be blended with the rubber composition of the present invention. Capable of being listed as the various components are, for example, additives including reinforcing fillers such as carbon black and silica; and/or inorganic fillers such as calcium carbonate and calcium acrbonate; vulcanization accelerators; antioxidants; zinc oxide; stearic acid; softening agents; and ozone deterioration preventives. Capable of being listed as the vulcanization accelerators are thiazole vulcanization accelerators such as M: 2-mercaptobenzothiazole, DM: dibenzothiazolyl disulfide and CZ: N-cyclohexyl-2-benzothiazolylsulfenamide; thiuram vulcanization accelerators such as TT: tetramethylthiuram sulfide; and guanidine vulcanization accelerators such as DPG: diphenylguanidine.

Further, sulfur can be blended in a range of 0.5 to 10 parts by weight, preferably 0.5 to 3.0 parts by weight and more preferably 1.0 to 2.0 parts by weight based on 100 parts by weight of the rubber component.

The rubber composition of the present invention can be produced, for example, by kneading the respective components described above by means of equipment such as a Banbury mixer and a kneader, and the rubber composition passes through molding and vulcanizing and then can suitably be used as a tread part for a tire.

EXAMPLES

Next, the present invention shall be explained in further details with reference to examples and comparative examples, but the present invention shall not be restricted by examples and comparative examples.

[Production of Tires]

The rubber compositions prepared in examples and comparative examples were blended and kneaded according to the blend formulations shown in Table 1 and used for tread rubbers to produce test tires which were pneumatic radial tires of 195/65R15 for passenger cars.

[Measurement of Glass Transition Point: Tg]

Measurement was carried out based on JIS K7121-2012 by means of a differential scanning calorimeter manufactured by TA Instruments Inc.

[Evaluation of Low Temperature Brittleness Resistance]

A rubber test piece was prepared based on a low temperature brittleness test method of JIS K7216 to subject the rubber test piece to a low temperature impact brittleness test. All results were shown by an index, wherein the value of a test piece obtained in Example 2 was set to 100. The larger the numerical value is, the better the low temperature brittleness resistance is.

[Evaluation of Wet Performance]

The test tires obtained in the manner described above were installed in a test car, and the driver sensory evaluated a driving stability on a wet road in a real car test to show the results by an index, wherein the value of the tires obtained in Example 2 was set to 100. The larger the numerical value is, the better the wet performance is.

[Evaluation of Dry μ]

The test tires obtained in the manner described above were installed in the test car, and the driver sensory evaluated a gripping force on a dry road in the real car test to show the results by an index, wherein the value of the tires obtained in Example 2 was set to 100. The larger the numerical value is, the better the dry μ is.

[Evaluation of Dry Handling]

The test tires obtained in the manner described above were installed in the test car, and the driver sensory evaluated a driving stability on a dry road in the real car test to show the results by an index, wherein the value obtained in Example 2 was set to 100. The larger the numerical value is, the better the dry handling is.

[Evaluation of Rolling Resistance]

The rubber compositions prepared in examples and comparative examples were blended and kneaded according to the blend formulations shown in Table 1, and the respective rubber compositions were vulcanized at 145° C. for 33 minutes to obtain vulcanized rubbers. The vulcanized rubbers thus obtained were used to measure a loss tangent: tan δ at 0° C., 30° C. and 60° C. on the conditions of an initial strain of 2%, a dynamic strain of 1% and a frequency of 52 Hz by means of a spectrometer manufactured by Ueshima Seisakusho Co., Ltd. In all cases, the reciprocal numbers of tan δ of the samples were used and shown by an index, wherein the value of the tires obtained in Example 2 was set to 100. The larger the numerical value is, the better the rolling resistance is.

TABLE 1

|  | phr = parts per hundred rubber | | | | | |
|---|---|---|---|---|---|---|
|  | Comparative Example | | | | | Example |
|  | 1 | 2 | 3 | 4 | 5 | 1 |
| E-SBR (phr)/Tg (° C.) | 50/−23 | 50/−30 | 50/−23 | 20/−23 | 25/−23 | 30/−23 |
| S-SBR (phr)/Tg (° C.) | 50/−18 | 30/−18 | 30/−35 | 60/−16 | 25/−18 | 60/−18 |
| Mw/Mn | 2.1 | 2.1 | — | 3.2 | 2.1 | 2.1 |
| Low Tg polymer (phr) *[1] | 0 | 20 | 20 | 20 | 50 | 10 |
| Carbon black *[2] | 12 | 12 | 12 | 12 | 12 | 12 |
| Silica *[3] | 88 | 88 | 88 | 88 | 88 | 88 |
| Oil *[4] | 8 | 8 | 8 | 8 | 8 | 8 |
| Thermoplastic resin *[5] | 5 | 5 | 5 | 5 | 5 | 5 |
| Elastic modulus modifier *[6] | 2.5 | 2.5 | 2.5 | 2.5 | 2.5 | 2.5 |
| Evaluation | | | | | | |
| Low-temperature brittleness resistance | 80 | 115 | 118 | 102 | 125 | 99 |
| Wet performance | 105 | 95 | 94 | 102 | 95 | 100 |
| Dry μ | 100 | 93 | 92 | 103 | 91 | 102 |
| Dry handling | 98 | 94 | 95 | 103 | 93 | 101 |
| Rolling resistance | 95 | 103 | 104 | 92 | 105 | 99 |

|  | Example | | | | | |
|---|---|---|---|---|---|---|
|  | 2 | 3 | 4 | 5 | 6 | 7 |
| E-SBR (phr)/Tg (° C.) | 20/−23 | 10/−23 | 50/−23 | 30/−23 | 30/−23 | 30/−23 |
| S-SBR (phr)/Tg (° C.) | 60/−18 | 60/−18 | 30/−5 | 60/−18 | 60/−18 | 60/−18 |
| Mw/Mn | 2.1 | 2.1 | 1.8 | 2.1 | 2.1 | 2.1 |
| Low Tg polymer (phr) | 20 | 30 | 20 | 10 | 10 | 10 |
| Carbon black | 12 | 12 | 12 | 12 | 12 | 12 |

TABLE 1-continued

| | | | | | | |
|---|---|---|---|---|---|---|
| Silica | 88 | 88 | 88 | 88 | 88 | 88 |
| Oil | 8 | 8 | 8 | 8 | 8 | 8 |
| Thermoplastic resin | 5 | 5 | 5 | 0 | 5 | 0 |
| Elastic modulus modifier | 2.5 | 2.5 | 2.5 | 2.5 | 0 | 0 |
| Evaluation | | | | | | |
| Low-temperature brittleness resistance | 100 | 101 | 100 | 101 | 103 | 105 |
| Wet performance | 100 | 100 | 105 | 98 | 102 | 100 |
| Dry μ | 100 | 99 | 105 | 100 | 102 | 100 |
| Dry handling | 100 | 98 | 101 | 103 | 98 | 102 |
| Rolling resistance | 100 | 102 | 104 | 101 | 101 | 103 |

In Table 1, phr represents parts per hundred rubber, wherein the total amount of the rubber components are set to 100 phr.
*[1] rubber kind, NR = natural rubber SIR20
*[2] N234, ISAF, brand name: #78, manufactured by Asahi Carbon Co., Ltd.
*[3] brand name: Nipsil AQ, BET surface area: 205 m$^2$/g, manufactured by Tosoh Silica Corporation
*[4] brand name: Process X-140, manufactured by Japan Energy Corporation
*[5] C$_9$ resin, brand name: Nisseki Neo Polymer (TM) 140, manufactured by JXTG Nippon Oil & Energy Corporation
*[6] maleic acid•polyethylene glycol polycondensate/silica 60/40

All the rubber compositions prepared in Examples 1 to 7 are excellent in a low temperature brittleness resistance as compared with the rubber composition prepared in Comparative Example 1 in which the low Tg polymer was not blended. On the other hand, while the low temperature brittleness resistance is improved in Comparative Example 5 in which the natural rubber was blended as the low Tg polymer over the limit, both the wet performance and the dry performance are deteriorated. All the rubber compositions prepared in Examples 1 to 7 in which the natural rubber was appropriately blended as the low Tg polymer are balanced in a low temperature brittleness resistance, a wet performance and a dry performance. The balance is not achieved in Comparative Examples 2 and 3 in which Tg of the SBR does not satisfy the condition of the present invention. Also, the rolling resistance is deteriorated in Comparative Example 4 in which a molecular weight distribution of the High Tg SBR is large. Observing examples, while the low temperature brittleness resistance is enhanced when the natural rubber as the low Tg polymer is increased in an amount from Examples 1 toward 3, the wet performance and the dry performance are slowly reduced. However, if the condition of Tg of the SBR is satisfied, the wet performance and the dry performance are not quickly deteriorated and proceed keeping a balance. Also, the wet performance and the dry performance are compatible as well with the rolling resistance in the above cases. Further, in Example 4 in which a molecular weight distribution of the High Tg SBR is small, the properties are observed to be improved on the whole. In Example 5 in which the thermoplastic resin is not blended, Example 6 in which maleic acid•polyethylene glycol polycondensate as the elastic modulus modifier is not blended and Example 7 in which either is not blended, the various performances are balanced.

INDUSTRIAL APPLICABILITY

The use of the present invention provides the rubber compositions suited to a tread and the tires of all-weather type which allow a low temperature brittleness resistance to be compatible with a wet performance and a dry performance and which are improved as well in a heat generating property and durability and excellent performances on the road.

The invention claimed is:

1. A rubber composition of a diene rubber comprising an emulsion polymerized styrene butadiene rubber (E-SBR) and a solution polymerized styrene butadiene rubber (S-SBR) each having a glass transition temperature (Tg) of −25° C. or higher measured by a differential scanning calorimetry, and a polymer (P) having a lower Tg than the Tg of the emulsion polymerized styrene butadiene rubber and the solution polymerized styrene butadiene rubber, and 0.5 to 6 parts by weight of maleic acid•polyethylene glycol polycondensate as an elastic modulus modifier and silica, wherein a ratio (E-SBR+S-SBR)/P of the sum of the E-SBR and the S-SBR in terms of a part by weight to the polymer (P) having a lower Tg in terms of a part by weight satisfies 7/3 to 9/1, and a molecular weight distribution (Mw/Mn) of either polymer having a higher Tg out of the E-SBR and the S-SBR satisfies 2.5 or less.

2. The rubber composition as described in claim 1, wherein at least one thermoplastic resin selected from the group consisting of a C$_5$ resin, a C$_5$/C$_9$ resin, a C$_9$ resin, a rosin-modified petroleum resin, a dicyclopentadiene resin, a terpene resin, and an alkylphenol resin each having a softening point of 100° C. or higher is blended in an amount of 1 to 30 parts by weight based on 100 parts by weight of the diene rubber.

3. The rubber composition as described in claim 2, wherein either polymer having a higher Tg out of the emulsion polymerized styrene butadiene rubber and the solution polymerized styrene butadiene rubber is modified.

4. The rubber composition as described in claim 2, wherein the polymer (P) having a lower Tg than the Tg of the emulsion polymerized styrene butadiene rubber and the solution polymerized styrene butadiene rubber is selected from a natural rubber (NR) and/or a butadiene rubber (BR).

5. The rubber composition as described in claim 2, wherein a butadiene rubber (BR) is contained in an amount of 0 to 10 parts by weight.

6. The rubber composition as described in claim 1, wherein either polymer having a higher Tg out of the emulsion polymerized styrene butadiene rubber and the solution polymerized styrene butadiene rubber is modified.

7. The rubber composition as described in claim 6, wherein the polymer (P) having a lower Tg than the Tg of the emulsion polymerized styrene butadiene rubber and the solution polymerized styrene butadiene rubber is selected from a natural rubber (NR) and/or a butadiene rubber (BR).

8. The rubber composition as described in claim 6, wherein a butadiene rubber (BR) is contained in an amount of 0 to 10 parts by weight.

9. The rubber composition as described in claim 1, wherein the polymer (P) having a lower Tg than the Tg of the emulsion polymerized styrene butadiene rubber and the solution polymerized styrene butadiene rubber is selected from a natural rubber (NR) and/or a butadiene rubber (BR).

10. The rubber composition as described in claim 1, wherein a butadiene rubber (BR) is contained in an amount of 0 to 10 parts by weight.

11. A pneumatic tire prepared by using the rubber composition as described in claim 1 for a tread part.

12. The pneumatic tire prepared by using the rubber composition as described in claim 2 for a tread part.

13. The pneumatic tire prepared by using the rubber composition as described in claim 6 for a tread part.

* * * * *